US006292836B1

United States Patent
Teraoka (10) Patent No.: US 6,292,836 B1
(45) Date of Patent: Sep. 18, 2001

(54) COMMUNICATION METHOD AND COMMUNICATION APPARATUS (75) Inventor: Fumio Teraoka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/161,938

(22) Filed: Sep. 28, 1998

(30) Foreign Application Priority Data

Sep. 30, 1997 (JP) .................................................. 09-266149

(51) Int. Cl.$^7$ ...................................................... G06F 15/16
(52) U.S. Cl. ........................... 709/236; 709/245; 709/238
(58) Field of Search ..................................... 709/236, 245, 709/240, 238, 246, 226, 227, 229, 250, 230; 370/351, 401, 409, 911

(56) References Cited

U.S. PATENT DOCUMENTS 5,430,709 * 7/1995 Galloway .................................. 370/13
5,757,924 * 5/1998 Friedman et al. ...................... 380/49

* cited by examiner

Primary Examiner—Mehmet B. Geckil
(74) Attorney, Agent, or Firm—Fulwider Patton Lee & Utecht, LLP (57) ABSTRACT

The communication method and communication apparatus according to the invention are capable of generating a packet having a header which includes at least data representing an identifier of a transmitting end point of a logical communication channel, data representing an identifier of a receiving end point of the logical communication channel, data representing an address corresponding to the identifier of the transmitting end point of the logical communication channel, data representing an address corresponding to the identifier of the receiving end point of the logical communication channel, data representing an IP address corresponding to an address of the transmitting end point of the logical communication channel, and data representing an IP address corresponding to an address of the receiving end point of the logical communication channel; and are capable of transmitting the packet thus generated. The inventive arrangements allow the initially established logical communication channel to remain intact and available even if a computing entity is moved from one computer to another or if a computer in which a computing entity resides is relocated within the network.

10 Claims, 7 Drawing Sheets

COMMUNICATION METHOD AND COMMUNICATION APPARATUS

BACKGROUND OF THE INVENTION

The present invention relates to a communication method and a communication apparatus. More particularly, the invention relates to a communication method and a communication apparatus whereby a TCP connection is maintained if an end point of that TCP connection is moved between computers or if a computer where an end point of the connection resides is relocated over the Internet.

Figure 7:
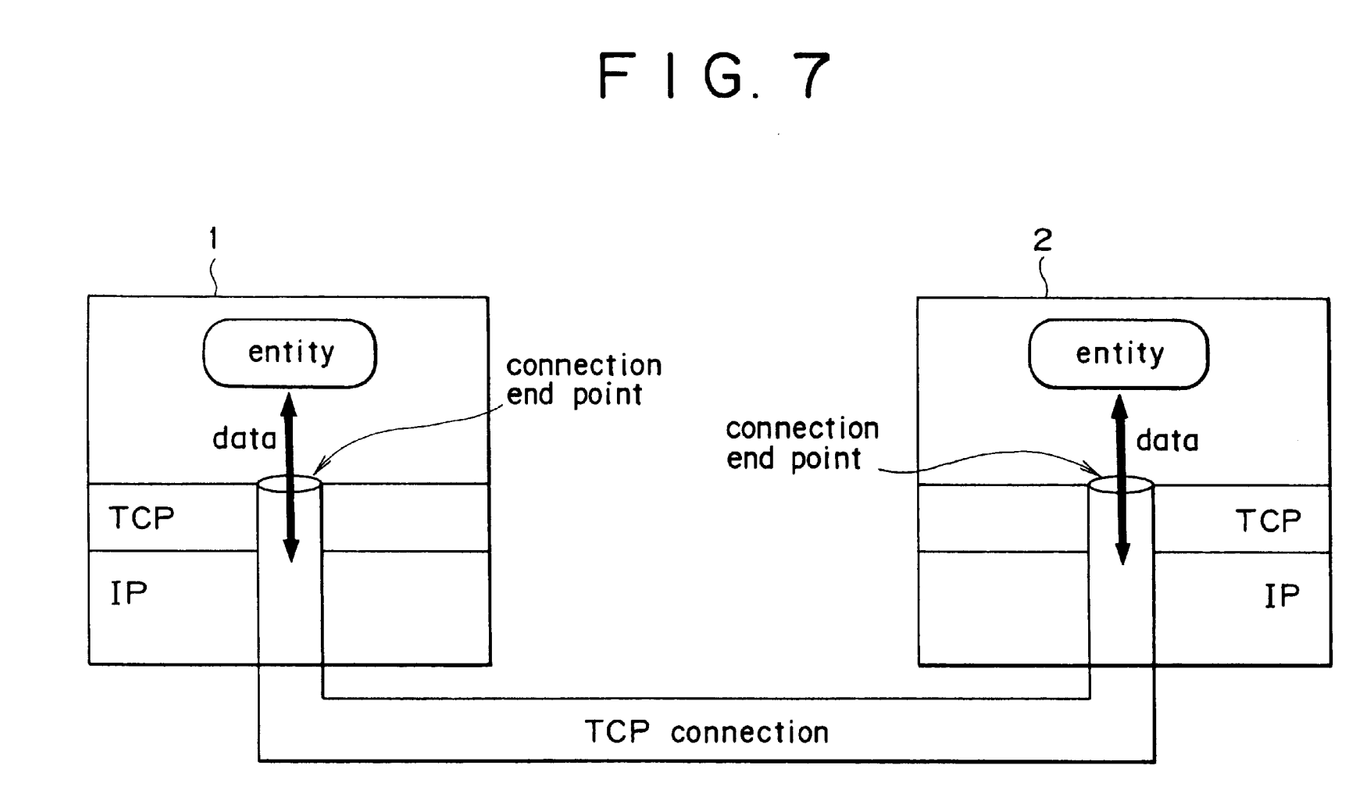
FIG. 7 is a schematic view of a related art TCP connection defined by its end points.

Over a computer network, protocols such as the TCP (Transmission Control Protocol) are used to ensure reliable communications between computers. As shown in FIG. 7, the TCP establishes a logical communication channel (called a TCP connection) between computers prior to communication therebetween. The TCP acts as highly dependable connection type protocol. To perpetuate its reliable operation, the TCP possesses such functions as sequence control, acknowledgment, window control and flow control.

Figure 8:
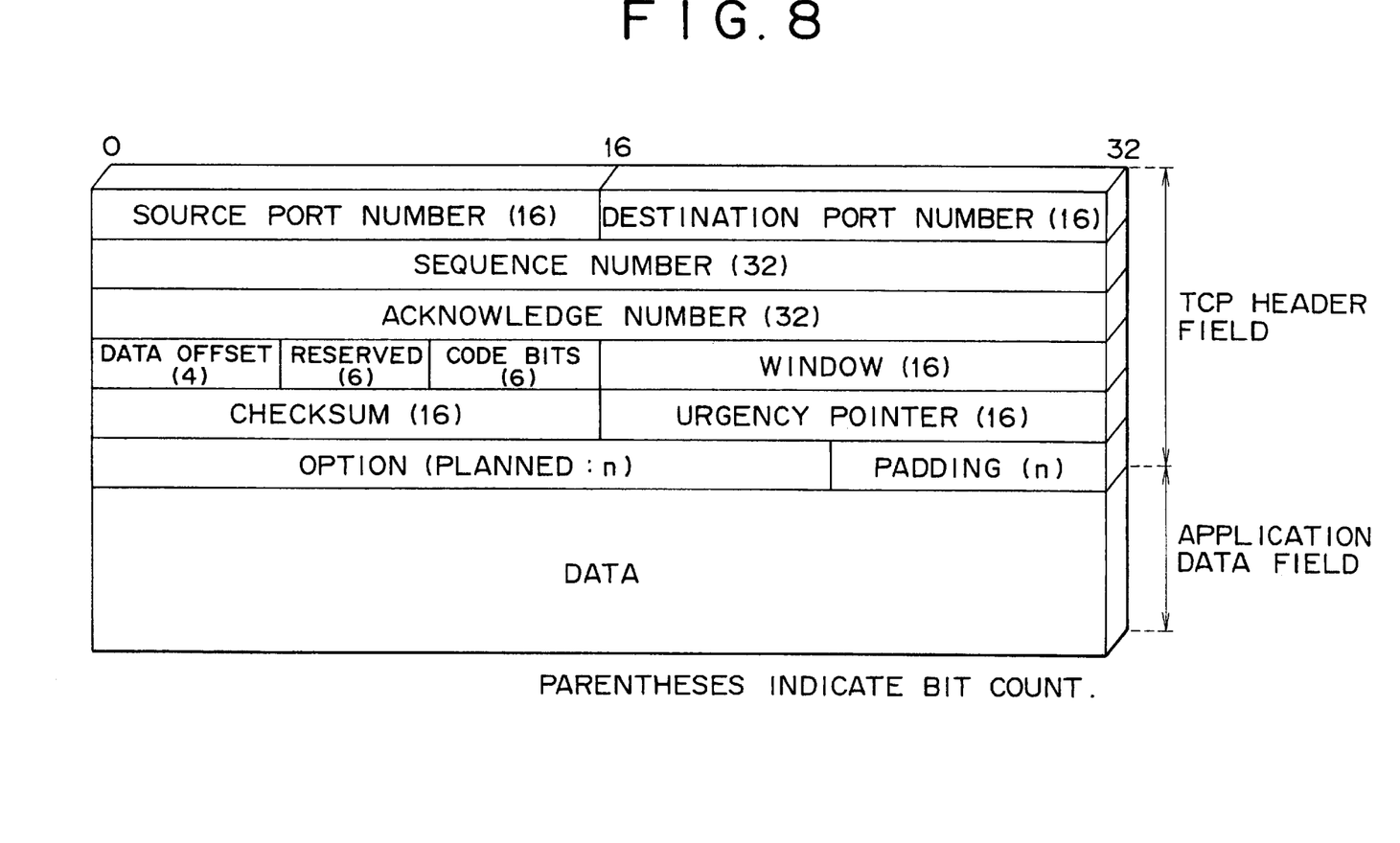
FIG. 8 is a schematic view of a related art TCP segment format.

The TCP transfers data to an IP (Internet Protocol) in units called segments. Each segment is made up of a TCP header field and an application field, as illustrated in FIG. 8. In the TCP header field, a source port number (16 bits) represents a port number, used by the TCP, of a transmission source. A destination port number (16 bits) denotes a port number, also used by the TCP, of a transmission destination.

A sequence number (32 bits) indicates the position of the segment in question in a data stream to be transferred. When a connection is established, the sequence number is initialized. Thereafter, the sequence number is counted up every time a data transmission takes place. Even if IP datagrams are not transmitted in sequence, the initial data stream is reproduced on the basis of the sequence numbers involved. If the same segment is found to be received in duplicate as evidenced by a duplicate sequence number, the duplicate segment is discarded.

An acknowledge number (32 bits), to be returned to the transmission source, is the sequence number of the most recent segment normally received and incremented by 1, i.e., the sequence number of the segment to be received next. The source checks to see if the received acknowledge number coincides with the sequence number of the segment to be transmitted next. If the two numbers match, normal communication is confirmed.

It may happen that an acknowledge number fails to arrive within a predetermined period of time because transmitted data or an acknowledge number has been lost in transit for some reason (retransmission time-out). In that case, a retransmission process takes place.

A data offset (4 bits) indicates the size of the TCP header field in units of four octets (32 bits). As such, the data offset denotes the starting position of data within the segment. A value of 5 is set to the data offset if no option is included.

Code bits (6 bits) are constituted by the following six-bit control flags each indicating status: a URG (urgent flag) indicates the presence of data to be dealt with urgently. The position of the data is indicated by an urgency pointer, to be described later. An ACK (acknowledgment flag) indicates the current use of an acknowledge number. A PSH (push flag), when set, requires that received data be handed over immediately to an application layer. An RST (reset flag) denotes forced disconnection. A SYN (synchronize flag), used when a connection is established, initializes the sequence number. A FIN (finish flag) indicates the completion of a connection.

A window (16 bits) indicates the size of a buffer furnished for window control. Window control is a function that allows a plurality of segments to be transmitted, within the size of a buffer, continuously without waiting for the receipt of an acknowledge number. When the process of acknowledgment is omitted, data transmission is carried out all the more efficiently. If data cannot be received for some reason, the window size may be varied so as to effect suitable flow control.

A checksum (16 bits) is used to verify whether transmitted data have been corrupted in transit. An urgency pointer (16 bits) indicates the position of data to be dealt with when the above-mentioned URG flag is set.

A TCP connection is defined by a pair of end point identifiers (EndPointID), one representing a local end point, the other denoting a remote end point as shown below.

TCP connection={EndPointID_local, EndPointID_remote}

Each end point identifier of the TCP connection is defined by a combination of an IP address and a port number as shown below.

EndPointID={IPaddr, port}

Thus the TCP connection is defined by the following four items of identification:

TCP connection = {IPaddr_local, port_local,
IPaddr_remote, port_remote}

Conventionally, if an end point of an TCP connection is moved from one computer to another, that connection cannot be maintained because the IP address is changed. Likewise, if a computer wherein an end point of a TCP connection resides is relocated on the Internet, that TCP connection cannot be maintained as well because of the change in the IP address.

SUMMARY OF THE INVENTION

It is therefore an object of the present invention to provide a communication method and a communication apparatus whereby end points of a TCP connection may be moved between computers in a transparent manner and whereby a TCP connection may be maintained even if a computer in which an end point of the connection resides is relocated on the Internet.

In carrying out the invention and according to a first aspect thereof, there is provided a communication method comprising the steps of: generating a packet having a header which includes at least data representing an identifier of a transmitting end point of a logical communication channel, data representing an identifier of a receiving end point of the logical communication channel, data representing an address corresponding to the identifier of the transmitting end point of the logical communication channel, data representing an address corresponding to the identifier of the receiving end point of the logical communication channel, data representing an IP address corresponding to an address of the transmitting end point of the logical communication channel, and data representing an IP address corresponding to an address of the receiving end point of the logical communication channel; and transmitting the packet generated by the generating step.

According to a second aspect of the invention, there is provided a communication apparatus comprising: generating means for generating a packet having a header which includes at least data representing an identifier of a transmitting end point of a logical communication channel, data representing an identifier of a receiving end point of the logical communication channel, data representing an address corresponding to the identifier of the transmitting end point of the logical communication channel, data representing an address corresponding to the identifier of the receiving end point of the logical communication channel, data representing an IP address corresponding to an address of the transmitting end point of the logical communication channel, and data representing an IP address corresponding to an address of the receiving end point of the logical communication channel; and transmitting means for transmitting the packet generated by the generating means.

As outlined above, the inventive communication method and communication apparatus are capable of generating a packet including at least data representing an identifier of a transmitting end point of a logical communication channel, data representing an identifier of a receiving end point of the logical communication channel, data representing an address corresponding to the identifier of the transmitting end point of the logical communication channel, data representing an address corresponding to the identifier of the receiving end point of the logical communication channel, data representing an IP address corresponding to an address of the transmitting end point of the logical communication channel, and data representing an IP address corresponding to an address of the receiving end point of the logical communication channel; and are capable of transmitting the packet thus generated.

PREFERRED EMBODIMENTS OF THE INVENTION

A VTCP (virtual TCP) connection used by the communication apparatus according to the invention is described below. The VIP (Virtual Internet Protocol) clearly distinguishes location designators (addresses) of computers (also called host computers) from their identifiers. This feature is intended to implement communications that are transparent to movements (called movement transparency).

Movement transparency may be defined as the ability of a computer to communicate with another computer regardless of the latter's location on a network through the use of unchanging identifiers. The feature allows illustratively a TCP connection to remain unchanged before and after a computer relocation on the network. Movement-transparent communications are not available over the Internet because the IP address is of the nature of dual identification involving an address and an identifier.

Specifically, movement transparency is implemented where an IP address (location designator) is supplemented by a VIP address that is introduced as an identifier specific to each host computer (called a host hereunder where appropriate).

The VIP address and IP address have the same format and cannot be distinguished intrinsically from one another. The relation between these two kinds of addresses is similar to that which exists between a virtual address of a virtual storage system and a physical address under an operating system.

Mapping from any VIP address to the corresponding IP address is done efficiently by use of a cache called an AMT (address mapping table) in the VIP layer. In the description that follows, data units making up the AMT are each called an AMT entry. The AMT entry is composed of a VIP address, an IP address, a version number and other control information.

The header of a packet transmitted by a mobile computer (e.g., a mobile host 24 in FIG. 1 having generating and transmitting means) includes a VIP address (corresponding to a transmitting host identifier of FIG. 2) and an IP address (corresponding to a transmitting host address in FIG. 2) of the transmitting computer. When a mobile computer transmits a packet to a specific computer (receiving computer) on a suitable network, the VIP address and IP address contained in the packet header and representing the transmitting computer are read by the routers transited by the packet and eventually by the computer that receives the packet. AMT entries are created along the way on the basis of the addresses thus read.

That is, as the packet transmitted by the mobile computer is forwarded over the network, AMT entries are spread principally along the packet route.

In a distributed computing environment, computing entities (processes, objects, agents, etc.) may move between computers as data processing advances. Where the TCP is used as communicating means, a TCP connection must be reestablished every time a computing entity moves from one computer to another. In such a case, it is convenient if an end point of the TCP connection is shifted transparently between the computers. Likewise, it is convenient if a TCP connection is kept intact when a computer in which an end point of the connection resides is relocated over the Internet.

The above features are implemented by introducing a VTCP (virtual TCP) connection into the related art TCP setup. A VTCP connection is defined by end points each comprising a pair of identifiers "VEndPointID" and "VEndPointAddr" as indicated below.

VTCP connection end point={VEndPointID, VEndPointAddr}

The VTCP connection end point identifier (VEndPointID) is defined as follows:

VEndPointID={VIPaddr, vport} where, "VIPaddr" stands for the VIP address of the computer that generated a VTCP connection end point, and "vport" (virtual port number) denotes the port number in effect when the VTCP connection end point was generated. The VIP address and the virtual port number remain unchanged even if a VTCP connection end point is moved to a different computer. The VIP address of a given computer remains constant when that computer is relocated over the Internet.

Each VIP connection end point address (VEndPointAddr) is defined as follows:

VEndPointAddr={VIPaddr, port} where, "VIPaddr" and "port" denote respectively the VIP address and the port number of the computer in which the VTCP connection end point currently resides. When a VTCP connection end point is created, a VTCP connection end point identifier is determined at that point and remains unchanged thereafter. A VTCP connection end point address varies when the end point is moved between computers.

A VTCP connection is defined by four items of identification shown below. These items allow an end point of the VTCP connection to be moved transparently between computers and enable the connection to remain unchanged and usable when the computer in which the end point resides is relocated over the network.

VTCP connection = {VEndPointID_local, VEndPointID_remote}
= {VIPaddr_local, vport_local,
VIPaddr_remote, vport_remote}

Figure 3:
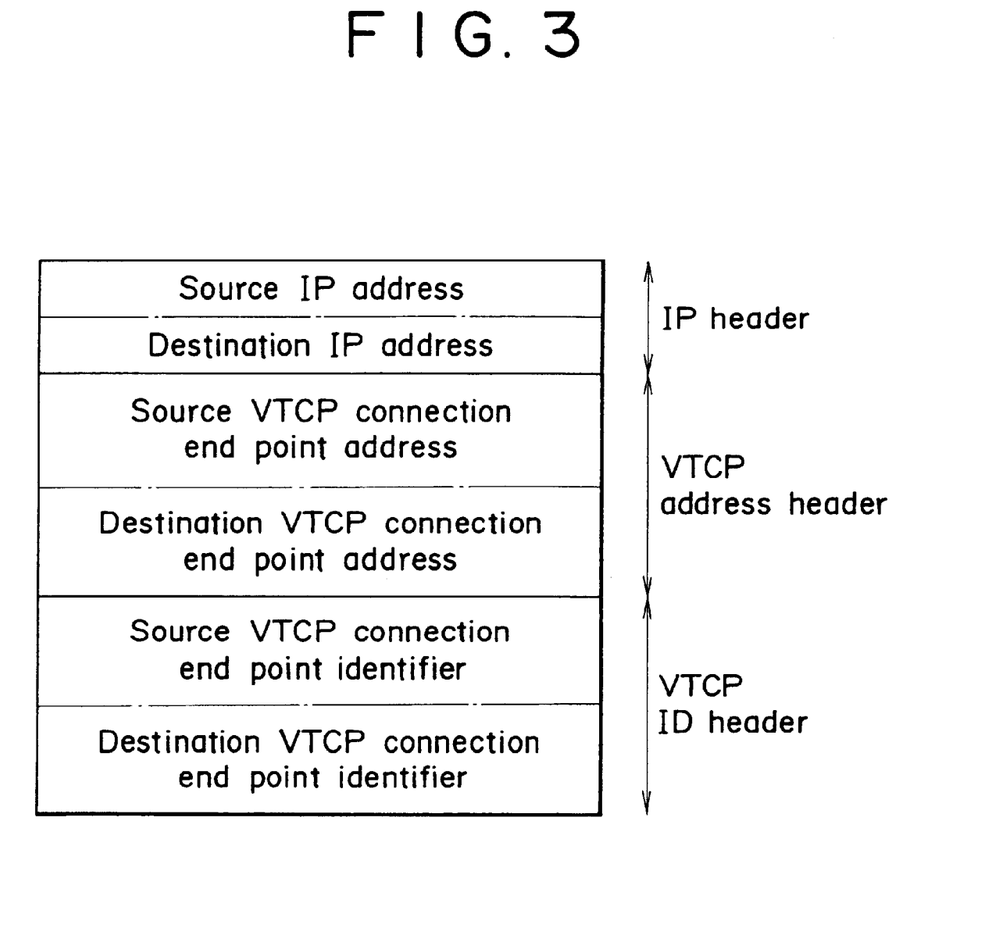
FIG. 3 is a schematic view of a typical packet header used by the VTCP.

FIG. 3 shows a typical packet header format. An IP header in the packet header comprises a source IP address, i.e., the address of a computer that transmits the packet in question; and a destination IP address, i.e., the address of a computer that receives the transmitted packet. The IP header is followed by a VTCP address header that includes identifiers of both end points of a VTCP connection, i.e., a source VTCP connection end point address and a destination VTCP connection end point address. After the VTCP address header comes a VTCP ID header that comprises a source VTCP connection end point identifier and a destination VTCP connection end point identifier.

What happens when a computer is relocated over the network will now be described by referring to FIG. 4. It is assumed here that as shown in Subfigure (a) of FIG. 4, a VTCP connection {VEndPoint_A, VEndPoint_B} is established between a VTCP connection end point VEndPoint_A on a computer A and a VTCP connection end point VEndPoint_B on a computer B. It is also assumed that the VTCP connection is established in the same manner as the TCP connection.

VEndPointID_A=VEndPointAddr_A={VIPaddr_A, port_A}

VEndPointID_B=VEndPointAddr_B={VIPaddr_B, port_B} where, "VIPaddr_A" stands for the VIP address of the computer A and "port_A" for the port number assigned when "VEndPoint_A" was generated by the computer A. The same holds for "VIPaddr_B" and "port_B." In this case, the header of the packet sent from "VEndPoint_A" to "VEndPoint_B" is as shown in Subfigure (b) of FIG. 4. That is, the IP address (IPaddr_A) of the computer A is set to the source IP address, and the IP address (IPaddr_B) of the computer B is set to the destination IP address in the packet header. In the VTCP address header following the packet header, the VIP address (VIPaddr_A) and port number (port_A) of the computer A are set to the source VTCP connection end point address, and the VIP address (VIPaddr_B) and port number (port_B) of the computer B are set to the destination IP address. In the VTCP ID header that follows the VTCP address header, the VIP address (VIPaddr_A) and port number (port_A) of the computer A are set to the source VTCP connection end point identifier, and the VIP address (VIPaddr_B) and port number (port_B) of the computer B are set to the destination VTCP connection end point identifier.

Figure 4:
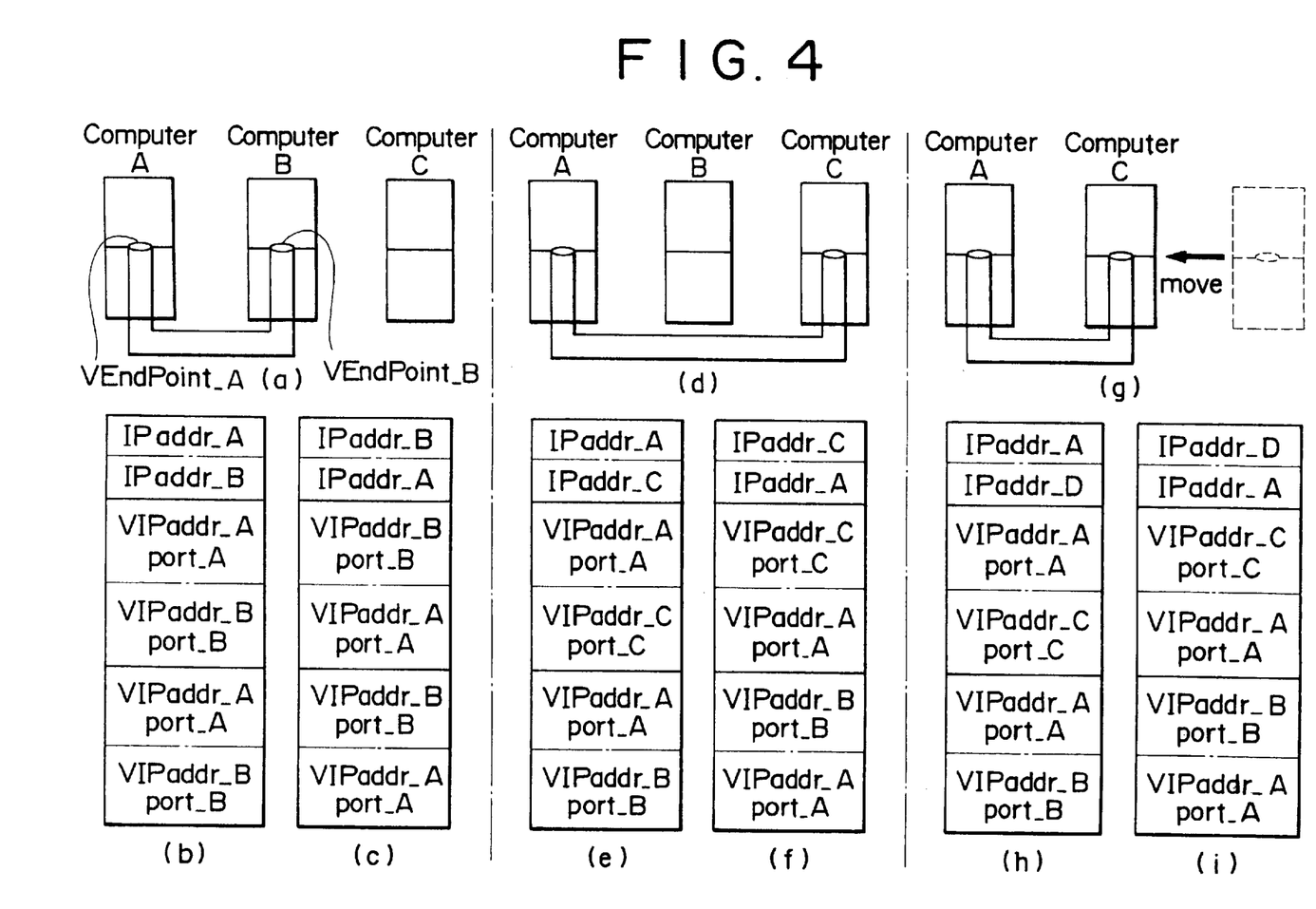
FIG. 4 is a set of views illustrating relations between communication setups and packet headers.

The header of the packet sent from "VEndPoint_B" to "VEndPoint_A" is as shown in Subfigure (c) of FIG. 4. Specifically, the IP address (IPaddr_B) of the computer B is set to the source IP address, and the IP address (IPaddr_A) of the computer A is set to the destination IP address in the packet header. In the VTCP address header following the packet header, the VIP address (VIPaddr_B) and port number (port_B) of the computer B are set to the source VTCP connection end point address, and the VIP address (VIPaddr_A) and port number (port_A) of the computer A are set to the destination IP address. In the VTCP ID header that follows the VTCP address header, the VIP address (VIPaddr_B) and port number (port_B) of the computer B are set to the source VTCP connection end point identifier, and the VIP address (VIPaddr_A) and port number (port_A) of the computer A are set to the destination VTCP connection end point identifier.

Suppose that, as shown in Subfigure (d) of FIG. 4, the VTCP connection end point "VEndPoint_B" is moved from the computer B to a computer C. Such a movement occurs illustratively when a process that uses the VTCP connection end point "VEndPoint_B" on the computer B is moved to the computer C. Upon movement of the VTCP connection end point "VEndPoint_B" from the computer B to the computer C, the identifier "VEndPointID_B" of the VTCP connection end point "VEndPoint_B" remains unchanged but "VEndPointAddr_B" is changed as follows:

VEndPointAddr_B={VIP_C, port_C} where, "VIP_C" represents the VIP address of the computer C and "port_C" denotes the port number assigned on the computer C.

The VTCP connection end point "VEndPoint_B" then notifies the end point "VEndPoint_A" of the changed address "VEndPointAddr_B." The notice provides the end point "VEndPoint_A" with the following information about connective correspondence:

VEndPointID_B={VIP_B, port_B}

VEndPointAddr_B={VIP_C, port_C}

As a result, the header of the packet transmitted from "VEndPoint_A" to "VEndPoint_B" becomes as depicted in Subfigure (e) of FIG. 4, and the header of the packet sent from "VEndPoint_B" to "VEndPoint_A" is as shown in Subfigure (f) of FIG. 4. Whereas the identifier of the end point "VEndPoint_B" remains unchanged, the address of "VEndPoint_B" has changed. At the same time, the IP address of the computer in which the end point "VEndPoint_B" resides has also changed.

Suppose now that the computer C is relocated over the wide area network as shown in Subfigure (g) of FIG. 4, and that the VIP address of the computer C remains unchanged while its IP address is changed to "IPaddr_D." In that case, the VIP allows the IP address of the computer C to be sent to the computer A. The computer A receives the following information about connective correspondence:

VIP address of computer C=VIPaddr_C

IP address of computer C=IPaddr_D

Consequently, the header of the packet transmitted from the end point "VEndPoint_A" to the end point "VEndPoint_B" becomes as illustrated in Subfigure (h) of FIG. 4, with the destination IP address changed from "IPaddr_C" (Subfigure (e) of FIG. 4) to "IPaddr_D." The header of the packet transmitted from the end point "VEndPoint_B" to the end point "VEndPoint_A" is as depicted in Subfigure (i) of FIG. 4, with the source IP address changed from "IPaddr_C" (Subfigure (f) of FIG. 4) to "IPaddr_D." As discussed, only the IP address of the computer where "VEndPoint_B" resides is changed.

Figure 5:
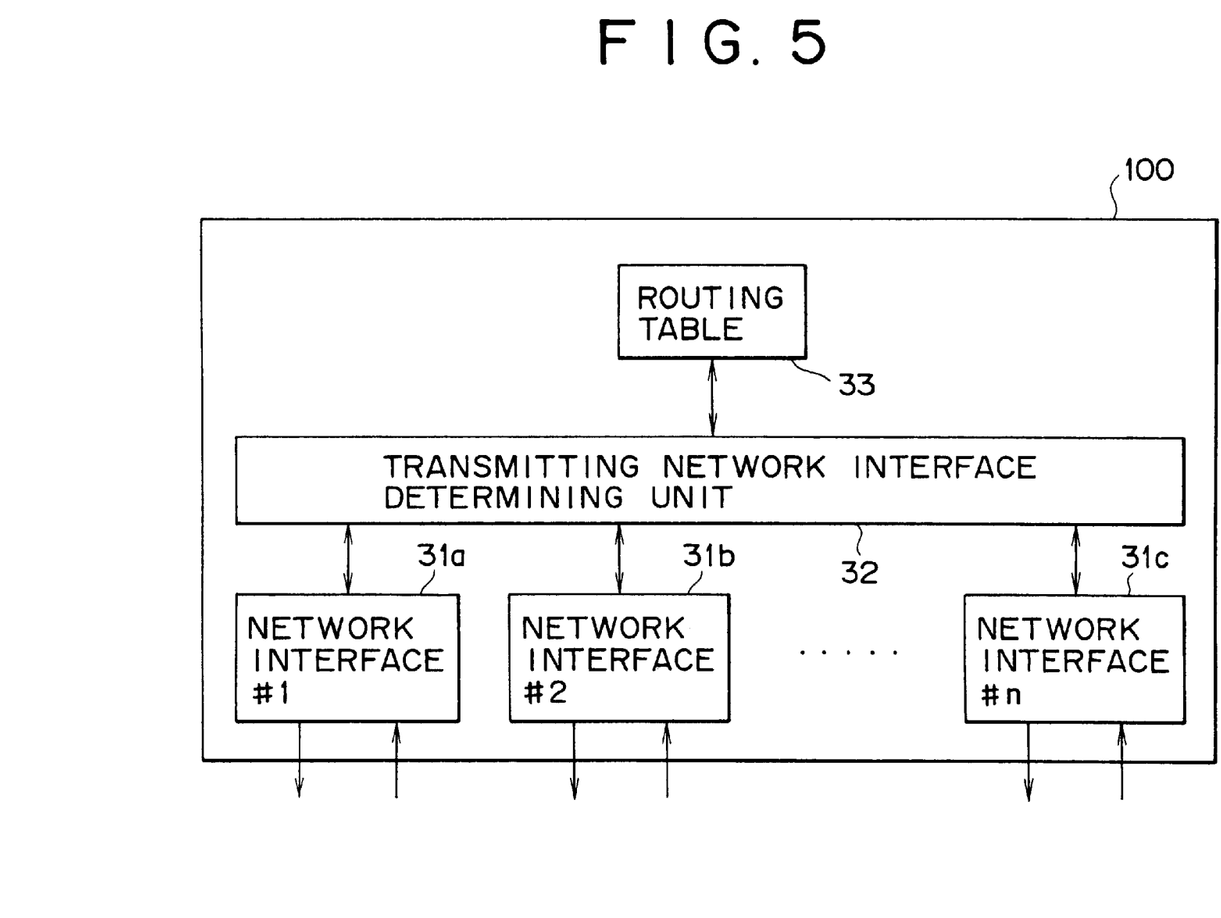
FIG. 5 is a block diagram of a typical home router 100.

FIG. 5 shows a typical constitution of a home router (router) 100 used by the network to which this invention applies. A packet is received by one of network interfaces 31a through 31c (transmitting means), and is forwarded by one of the network interfaces 31a through 31c which is determined by a transmitting network interface determining unit 32 (generating means). The packet-forwarding network interface is determined by use of a routing table 33. The router 100 also has a table that associates VIP addresses with IP addresses.

Figure 6:
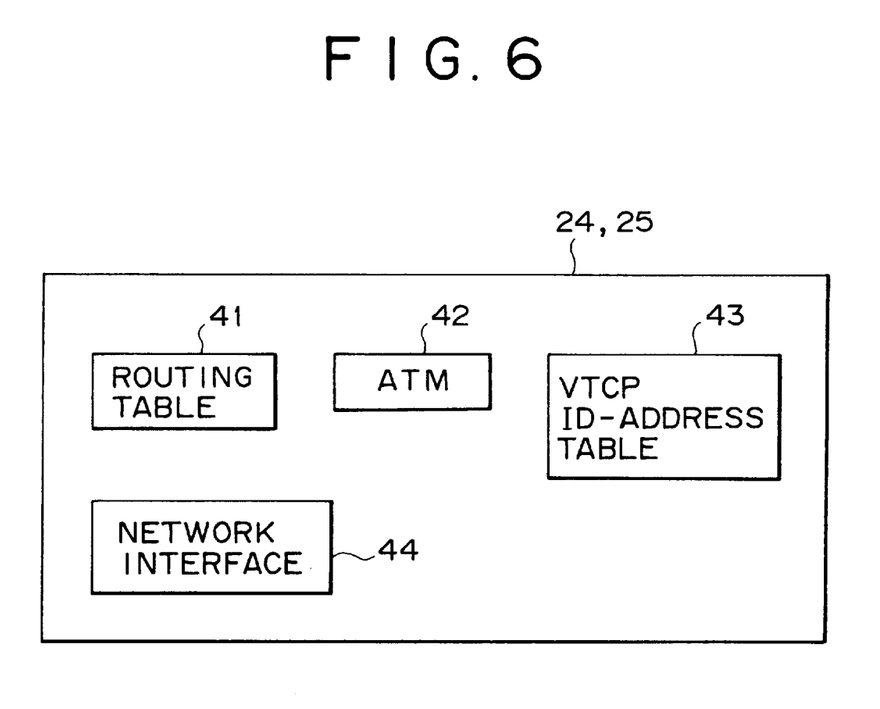
FIG. 6 is a block diagram of computers 24 and 25.

As shown in FIG. 6, computers such as a mobile host 24 and a host 25 each include illustratively a table (VTCP ID-address table) 43 that associates the identifiers of VTCP connection end points with their addresses; a table (AMT) 42 that associates the VIP addresses of computers with their IP addresses; a routing table 41; and a network interface 44.

Figure 1:
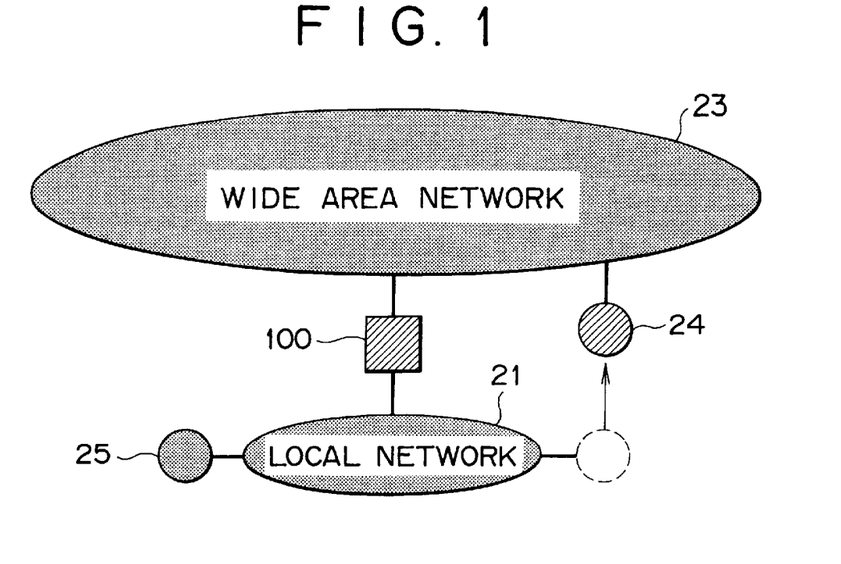
FIG. 1 is a schematic view showing a typical constitution of networks to which a communication apparatus of the invention is applied.
Figure 2:
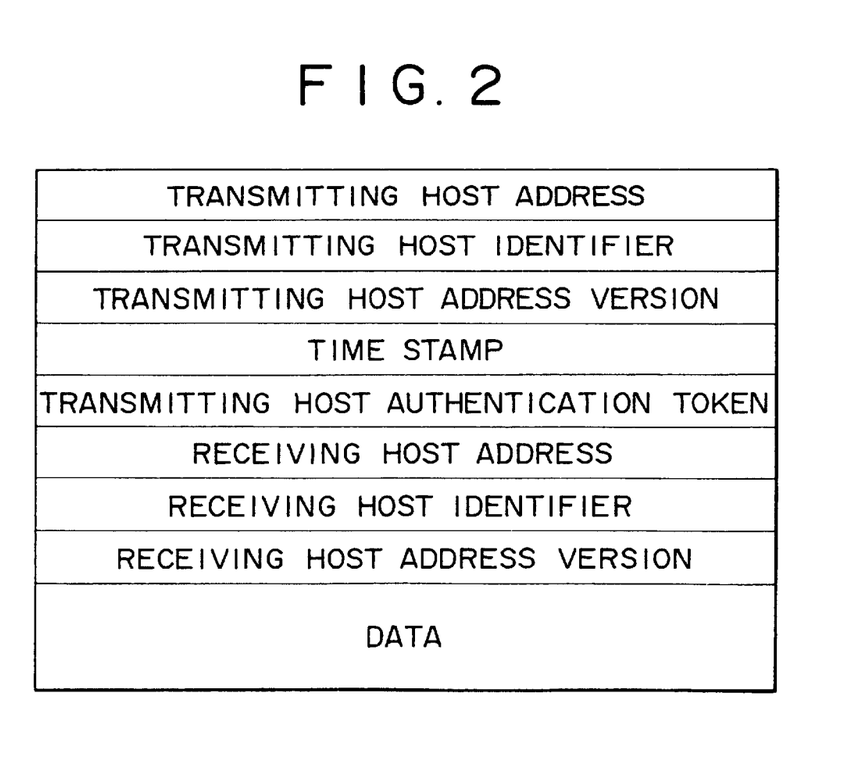
FIG. 2 is a schematic view of a typical packet header used by the VIP.

In the above setup, the computer A in FIG. 4 corresponds to the host computer 25 in FIG. 1, the computer C in FIG. 4 to the mobile host (MH) 24 in FIG. 1, and the computer B in FIG. 4 to another host computer over the wide area network 23 in FIG. 1.

Suppose that the TCP connection end point residing in the computer B is moved to the computer C. In that case, the relocated TCP connection end point uses the home router 100 to notify the TCP connection end point on the computer A of the address of the TCP connection end point on the computer C. The notice enables the computer A and home router 100 to know the correspondence between the identifier of the TCP connection end point on the computer C and the address of that end point.

Thereafter, packets may be exchanged between the TCP connection end point on the computer A and the TCP connection end point on the computer C. In this manner, when a computing entity such as a process, an object or an agent (i.e., TCP connection end point in the above example) is moved from one computer to another, the initially established logical communication channel (TCP connection in the case above) may be used continuously unchanged.

If the computer C (mobile host 24) is moved from a local network 21 to the wide area network 23 as shown in FIG. 1, or if the computer C is relocated within the wide area network 23, then the IP address of the computer C is changed. The correspondence between the changed IP address of the computer C and its VIP address is transmitted in a packet from the computer C to the computer A (host 25). The packet allows the home router 100 and the computer A to retain the address-to-address correspondence. Thereafter, the computers A and C may exchanges packets therebetween.

As described above, whenever a computing entity is moved to a different computer, the logical communication channel is relocated concurrently. This allows the initially established logical communication channel to be used continuously unchanged. The initial logical communication channel may also be used unchanged when a computer in which a computing entity resides is relocated within the wide area network.

Although the above embodiments of the invention are for use on a network over which packets are transmitted and received in accordance with the Virtual Internet Protocol, this is not limitative of the invention. This invention may also apply to networks based on other protocols.

As described, the communication method and communication apparatus according to the invention are capable of generating a packet having a header which includes at least data representing an identifier of a transmitting end point of a logical communication channel, data representing an identifier of a receiving end point of the logical communication channel, data representing an address corresponding to the identifier of the transmitting end point of the logical communication channel, data representing an address corresponding to the identifier of the receiving end point of the logical communication channel, data representing an IP address corresponding to an address of the transmitting end point of the logical communication channel, and data representing an IP address corresponding to an address of the receiving end point of the logical communication channel; and are capable of transmitting the packet thus generated. The inventive arrangements allow the initially established logical communication channel to remain intact and available even if a computing entity is moved from one computer to another or if a computer in which a computing entity resides is relocated within the network.

What is claimed is:

1. A method of communicating over a computer network comprising:

establishing a logical communication channel between a transmitting end point and a receiving end point through transmission of a packet having a header which includes an identifier of the transmitting end point, an identifier of a receiving end point, an address corresponding to the identifier of the transmitting end point, an address corresponding to the identifier of the receiving end point, an IP address corresponding to an address of the transmitting end point and an IP address corresponding to an address of the receiving end point; and upon movement of the receiving end point from a first computer to a second computer, notifying the transmitting end point of the address of the end point on the second computer and the IP address of the second computer.

2. The method of claim 1 wherein the step of notifying the transmitting end point comprises:

generating a packet having a header which includes the identifier of the transmitting end point, the identifier of the receiving end point, the address corresponding to the identifier of the transmitting end point, the address of the end point on the second computer, an IP address corresponding to the address of the transmitting end point and the IP address of the second computer; and transmitting the packet to the transmitting end point.

3. The method of claim 1 wherein the transmitting end point and the receiving end points are TCP connection end points.

4. A method of communicating over a computer network comprising:

establishing a logical communication channel between a transmitting end point resident within a first computer and a receiving end point resident within a second computer through transmission of a packet having a header which includes an identifier of the transmitting end point, an identifier of a receiving end point, an address corresponding to the identifier of the transmitting end point, an address corresponding to the identifier of the receiving end point, an IP address corresponding to an address of the transmitting end point and an IP address corresponding to an address of the receiving end point; and upon movement of the second computer to a new location within the computer network, notifying the transmitting end point of the IP address of the new location.

5. The method of claim 4 wherein the step of notifying the transmitting end point comprises:

generating a packet having a header which includes the identifier of the transmitting end point, the identifier of the receiving end point, the address corresponding to the identifier of the transmitting end point, the address corresponding to the identifier of the receiving end point, an IP address corresponding to the address of the transmitting end point and the IP address of the new location of the second computer; and transmitting the packet to the transmitting end point.

6. The method of claim 4 wherein the transmitting end point and the receiving end points are TCP connection end points.

7. An apparatus for communicating over a computer network comprising:

means for establishing a logical communication channel between a transmitting end point and a receiving end point through transmission of a packet having a header which includes an identifier of the transmitting end point, an identifier of a receiving end point, an address corresponding to the identifier of the transmitting end point, an address corresponding to the identifier of the receiving end point, an IP address corresponding to an address of the transmitting end point and an IP address corresponding to an address of the receiving end point; and means for notifying, upon movement of the receiving end point from a first computer to a second computer, the transmitting end point of the address of the end point on the second computer and the IP address of the second computer.

8. The apparatus of claim 7 wherein the means for notifying comprises:

means for generating a packet having a header which includes the identifier of the transmitting end point, the identifier of the receiving end point, the address corresponding to the identifier of the transmitting end point, the address of the end point on the second computer, an IP address corresponding to the address of the transmitting end point and the IP address of the second computer; and means for transmitting the packet to the transmitting end point.

9. An apparatus for communicating over a computer network comprising:

means for establishing a logical communication channel between a transmitting end point resident within a first computer and a receiving end point resident within a second computer through transmission of a packet having a header which includes an identifier of the transmitting end point, an identifier of a receiving end point, an address corresponding to the identifier of the transmitting end point, an address corresponding to the identifier of the receiving end point, an IP address corresponding to an address of the transmitting end point and an IP address corresponding to an address of the receiving end point; and means for notifying, upon movement of the second computer to a new location within the computer network, the transmitting end point of the IP address of the new location.

10. The apparatus of claim 9 wherein the means for notifying comprises:

means for generating a packet having a header which includes the identifier of the transmitting end point, the identifier of the receiving end point, the address corresponding to the identifier of the transmitting end point, the address corresponding to the identifier of the receiving end point, an IP address corresponding to the address of the transmitting end point and the IP address of the new location of the second computer; and means for transmitting the packet to the transmitting end point.

* * * * *